United States Patent [19]
Zhou

[11] Patent Number: 5,550,580
[45] Date of Patent: Aug. 27, 1996

[54] LOW BIT RATE AUDIO-VISUAL COMMUNICATION SYSTEM HAVING INTEGRATED PERCEPTUAL SPEECH AND VIDEO CODING

[75] Inventor: Yong Zhou, Washington Township, N.J.

[73] Assignee: Lucent Technologies Inc., Murray Hill, N.J.

[21] Appl. No.: 455,378

[22] Filed: May 31, 1995

Related U.S. Application Data

[62] Division of Ser. No. 223,903, Apr. 6, 1994.

[51] Int. Cl.$^6$ .................................................. H04N 7/14
[52] U.S. Cl. ............................. 348/15; 348/17; 348/484
[58] Field of Search ............................. 348/15, 17–20, 348/462, 484, 152, 161; 382/115, 117, 118; 381/36–42, 34, 29; H04N 7/14

[56] References Cited

U.S. PATENT DOCUMENTS 5,426,460   6/1995   Erving ........................................ 348/17

*Primary Examiner*—Victor R. Kostak

[57] ABSTRACT

Disclosed is a low bit rate audio and video communication system which employs an integrated encoding system that dynamically allocates available bits among the audio and video signals to be encoded based on the content of the audio and video information and the manner in which the audio and video information will be perceived by a viewer. A dynamic bit allocation and encoding process will evaluate the current content of the audio and video information and allocate the available bits among the audio and video signals to be encoded. In addition, an appropriate audio encoding technique is dynamically selected based on the current content of the audio signal. A face location detection subroutine will detect and model the location of faces in each video frame, in order that the facial regions may be more accurately encoded than other portions of the video frame. A lip motion detection subroutine will detect the location and movement of the lips of a person present in a video scene, in order to determine when a person is speaking and to encode the lip regions more accurately. The audio and video signals generated by a second part to a communication are monitored to determine if the second party is paying attention to the audio and video information transmitted by the first party to the communication.

9 Claims, 13 Drawing Sheets

| Speaker | Modelled Face Ellipse | | | | | | | Modelled Lip Ellipse | | | Present In Scene? | Talking? |
|---|---|---|---|---|---|---|---|---|---|---|---|---|
| | Ref. Major Axis | Current Major Axis | Ref. Minor Axis | Current Minor Axis | Ref. α | Current α | Ref. Center Pixel / Current Center Pixel | Major Axis | Minor Axis | α | Center Pixel | | |
| A | 140 | | 80 | | 0° | | 270, 140 | 30 | 10 | 90° | 270, 175 | Yes | Yes |
|   | 140 | | 78 | | 0° | | 274, 140 | | | | | | |
| B | 100 | | 65 | | 0° | | 120, 180 | 20 | 7 | 92° | 120, 225 | Yes | No |
|   | 98  | | 63 | | 2° | | 118, 180 | | | | | | |
| ... | | | | | | | | | | | | | |

LOW BIT RATE AUDIO-VISUAL COMMUNICATION SYSTEM HAVING INTEGRATED PERCEPTUAL SPEECH AND VIDEO CODING

This is a divisional of copending application(s) Ser. No. 08/223,903 filed on Apr. 6, 1994.

FIELD OF THE INVENTION

The present inventions relates to a low bit rate communication system for audio-visual applications, such as a video teleferecing system, and more particularly, to a method and apparatus for dynamically allocating bits for encoding audio and video signals based on the perceptual significance of the audio and video information.

BACKGROUND OF THE INVENTION

Due to the bandwidth limitations of transmission channels, there are a limited number of bits available for encoding the audio and video information associated with an audio-visual application, such as a video teleconference. Thus, many audio and video encoding techniques have been developed which attempt to encode the audio and video information with as few bits as possible while still maintaining the quality and intelligibility that are required for a given application.

There are many audio and video encoding techniques which have improved coding efficiency by removing the statistical redundancy arid perceptual irrelevancy from the audio or video signals, respectively. For example, the well-known MPEG video encoding technique, developed by the Motion Picture Experts Group, achieves significant bit rate reductions by taking advantage of the correlation between pixels in the space domain, and the correlation between image frames in the time domain.

A conventional audio-visual communication system will encode the audio signal and the sequence of image frames individually and then multiplex the two signals together for transmission over a digital channel to the receiver. Few, if any, audio-visual communication systems, however, have achieved bit rate reductions by analyzing both the audio and video signals and thereafter dynamically allocating the bits available for encoding the audio and video signals based on the perceptual significance of the audio and video information to a human observer.

Accordingly, a need exists for an audio-visual communication system that maximizes both bit rate efficiency and perceptual quality by performing an integrated bit assignment based on the perceptual significance of the audio and video information. In addition, a further need exists for an audio-visual communication system that dynamically encodes the audio signal based on the current content of the audio information.

SUMMARY OF THE INVENTION

Generally, according to one aspect of the invention, a low bit rate audio and video communication system, suitable for use in video teleconferencing applications, employs an integrated encoding system that dynamically allocates available bits among the audio and video signals to be encoded based on the content of the audio and video information and the manner in which the audio and video information will be perceived by a viewer.

According to one feature of the invention, the audio signal will be encoded with greater accuracy than the video signal when the audio signal consists of voice signals, such as when there is audio activity and the lips of a person in the video scene are moving, since a person will pay more attention to the voice of another person than to the associated image when presented with both simultaneously.

Another aspect of the invention will monitor the audio and video signals generated by a second party to a communication. For example, if the audio and video signals of the second party indicate that the second party is talking, such as when there is audio activity while the second party's lips are moving, the audio signal of the first party will not be transmitted to the second party with much detail, since the second party is most likely not listening carefully. In addition, if the video signal of the second party indicates that the second party is most likely not watching the video display, the video signal of the first party will not be transmitted to the second party with much detail, since the second party is most likely not watching the video display anyway.

Another feature of the invention will detect the location and movement of the lips of a person present in a video scene. Since a viewer will focus his or her attention on moving objects in a video scene, the lip region may be encoded more accurately than the remainder of the scene when the lips are known to be moving. In addition, the detection of lip motion allows the speaker to be distinguished from non-speakers when there is more than one person present in a video scene. Thus, the face of the speakers may be encoded more accurately than the face of the non-speakers.

Further, the motion information that is of most interest to a viewer in a video teleconference is lip movement. Thus, according to another aspect of the invention, if the lips are moving, the motion information in the video signal may be encoded more accurately than the spatial details. However, if the lips are not moving, there is little rapid motion information of interest, and the spatial details in the video signal may be encoded more accurately than the motion information.

According to a further feature of the invention, the audio signal will be encoded with a speech specific audio encoding technique when the audio signal consists of voice signals, and will be encoded with a non-speech specific audio encoding technique when the audio signal does not necessarily consist of voice signals.

A more complete understanding of the present invention, as well as further features and advantages of the invention, will be obtained by reference to the following Detailed Description with the accompanying drawings.

BRIEF DESCRIPTION OF THE DRAWINGS

FIG. 3 illustrates a speaker data base, suitable for use in the present invention, that maintains information associated with each person participating in a video teleconference;

DETAILED DESCRIPTION

Figure 1:
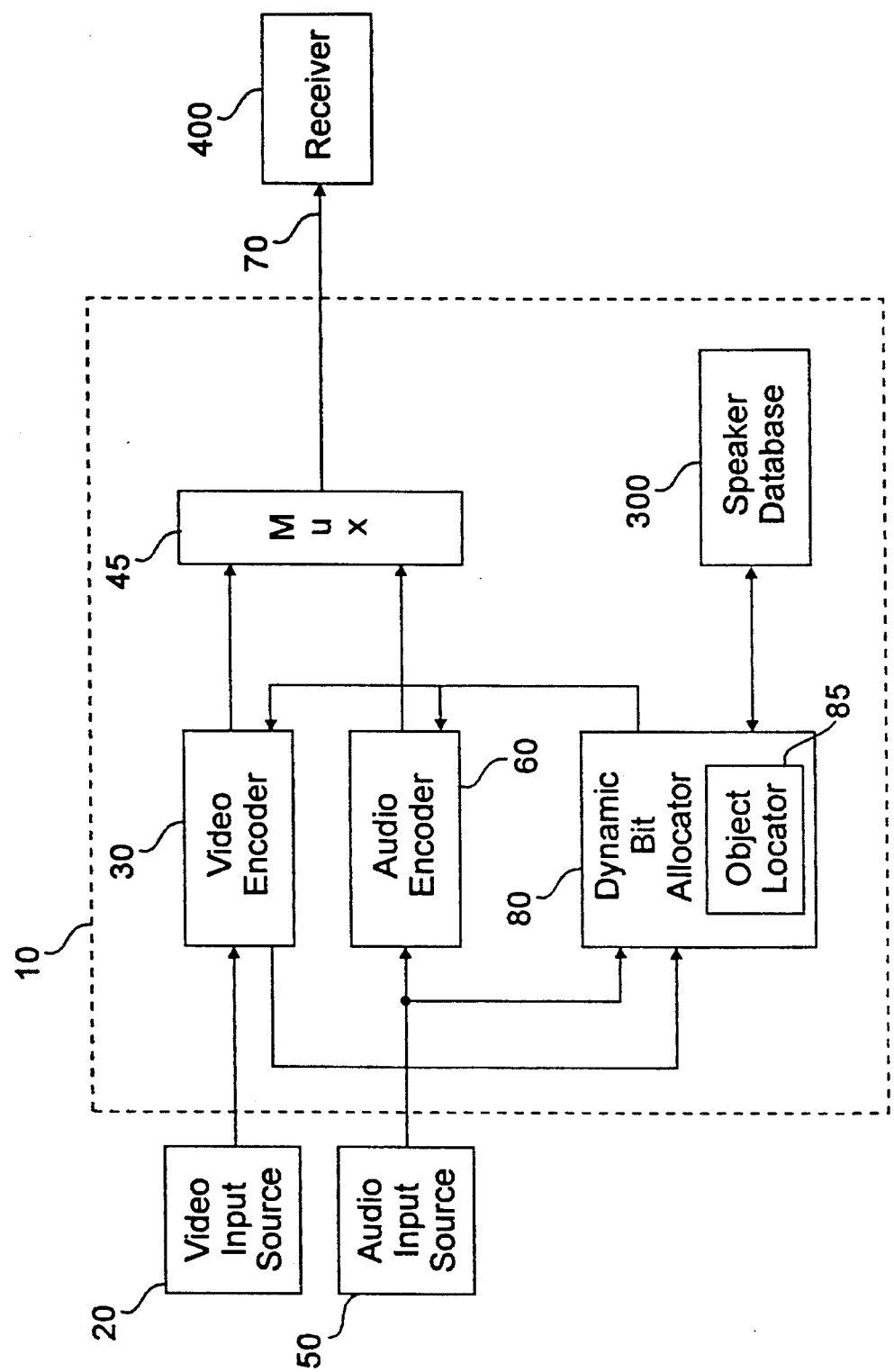
FIG. 1 is a schematic block diagram illustrating a transmitter for a low bit rate audio-visual communication system according to the present invention.

A transmitter 10 for a low bit rate audio-visual communication system, such as a video teleconferencing system, is illustrated in FIG. 1. The transmitter 10 encodes an audio signal and a sequence of image frames of the video signal associated with a first party to a videotelephone communication for transmission over a digital channel 70 to a receiver 400, illustrated in greater detail in FIG. 4, associated with a second party to the videotelephone communication. The transmitter 10 utilizes a multiplexer 45 to multiplex the audio and video signals prior to transmission.

Although the receiver 400 will receive the transmitted audio and video signals simultaneously for presentation to a viewer, the audio and video signals are typically not perceived with the same level of attention by the viewer. Due to the limitations of the human sensory perception systems, the users of a video teleconferencing system will typically focus their attention on particular features or details of an audio-visual presentation, such as a video teleconference, when their sensory systems are stimulated by various audio and video stimuli.

Thus, significant bit rate reductions can be obtained with little, if any, noticeable perceptual quality reduction by employing an integrated encoding system that dynamically allocates bits among the audio and video signals based on the perceptual significance of the audio and video information to a human viewer, as discussed further below.

It is known that a viewer of a video teleconference will typically pay more attention to the voice of the other party than to the associated image when the viewer's sense organs are excited by both voice and image information simultaneously. Thus, it is often said that the voice information will "mask" the image data. Accordingly, whenever the video teleconferencing system detects voice activity, the transmitter 10 should encode the voice signal with greater accuracy than the video signal.

In a video teleconferencing system, where the video images are primarily comprised of head-and-shoulder shots, the most likely object of interest to a viewer is the face of the other person. Thus, the facial region masks the remainder of the scene, and perceptual quality can be improved by allocating more of the video bits to encode the facial region of the person than the remainder of the scene.

Furthermore, a viewer will typically focus their attention on moving objects in a video scene, as opposed to the background scenery or other spatial details. In a video teleconferencing system, it is typically the mouth area, including the lips, jaw and cheeks, that are moving when a person is talking. Thus, when a person is known to be talking, perceptual quality can be improved by allocating more of the video bits to the mouth area than to the remainder of the face.

When a person is speaking, they have a reduced ability to listen and understand someone else who may be speaking. Thus, when it is known that a first party to a videotelephone communication is talking, it is unnecessary to encode the second party's voice with great accuracy, since the first party to the communication is most likely not listening carefully.

Finally, when there are multiple faces in a scene of a videotelephone communication, a viewer will generally pay more attention to the speaker. Thus, the speaker's face should be encoded more accurately than the other faces in the scene.

As shown in FIG. 1, a video encoder 30 is preferably configured to receive a digital video signal from a video input source 20, which may be comprised of an analog video camera and an analog-to-digital converter. As discussed further below in conjunction with FIG. 2, the video encoder 30 preferably employs a known variable-rate video encoding scheme, such as a three-dimensional subband image encoding technique, in order to facilitate the dynamic allocation of video bits.

As is well-known, three-dimensional subband image coding techniques divide a video picture into a plurality of spatial-temporal frequency bands and then quantize each band or channel. For a discussion of suitable three-dimensional subband image coding techniques, see Christine Podilchuk Arnaud Jacquin, "Subband Video Coding With a Dynamic Bit Allocation and Geometric Vector Quantization," SPIE Vol. 1666 Human Vision, Visual Processing, and Digital Display III, pp. 241–52 (February 1992); Arnaud Jacquin & Christine Podilchuk, "Very Low Bit Rate 3D Subband-Based Video Coding With a Dynamic Bit Allocation," SPIE Vol. 1977 Video Communications and PACS for Medical Applications, pp. 156–67 (April 1993), each incorporated herein by reference.

Figure 6:
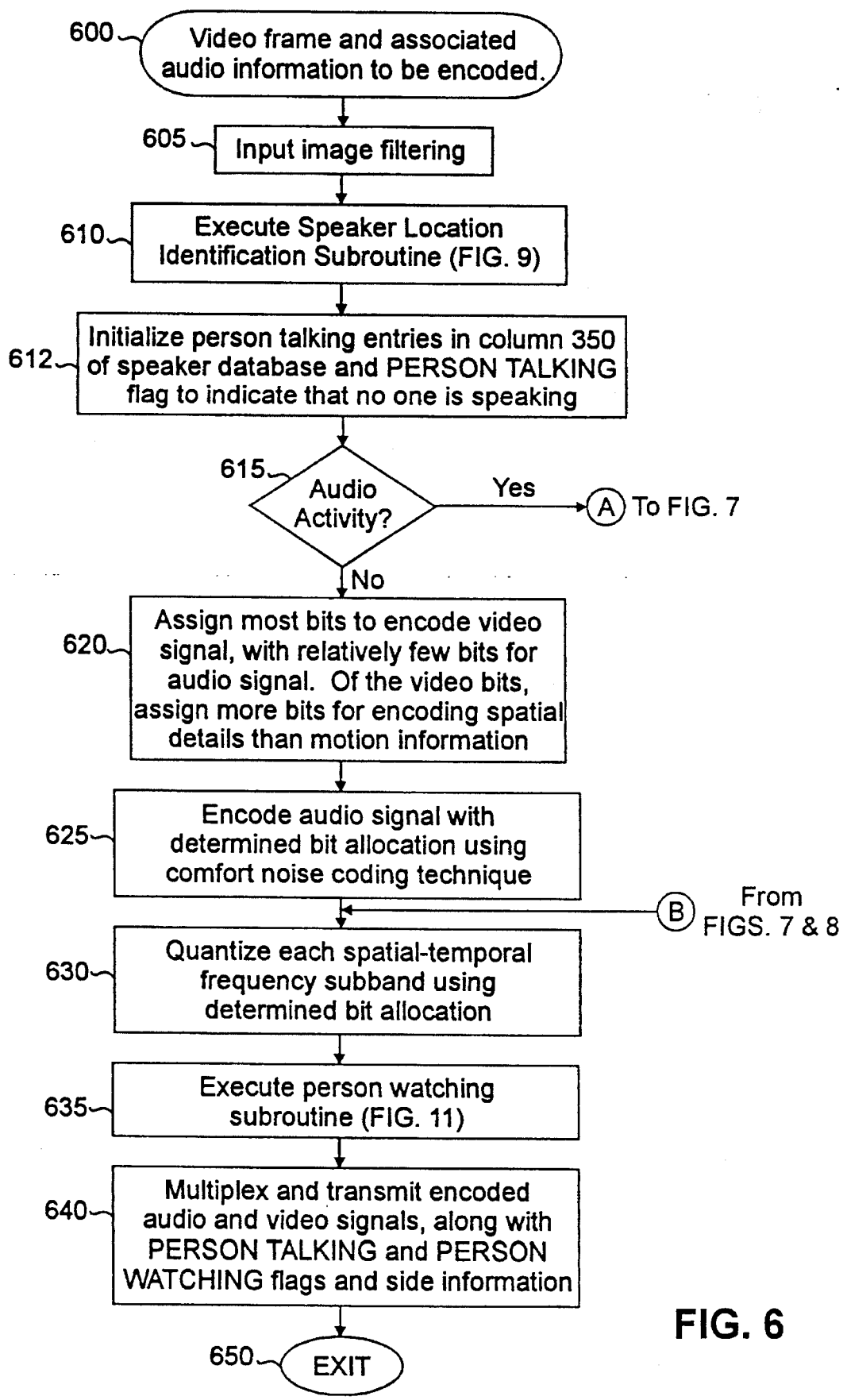
FIGS. 6 through 8, collectively, are a flow chart describing an exemplary dynamic bit allocation and encoding process according to the present invention, as utilized by a transmitter in encoding each video frame and associated audio information.
Figure 7:
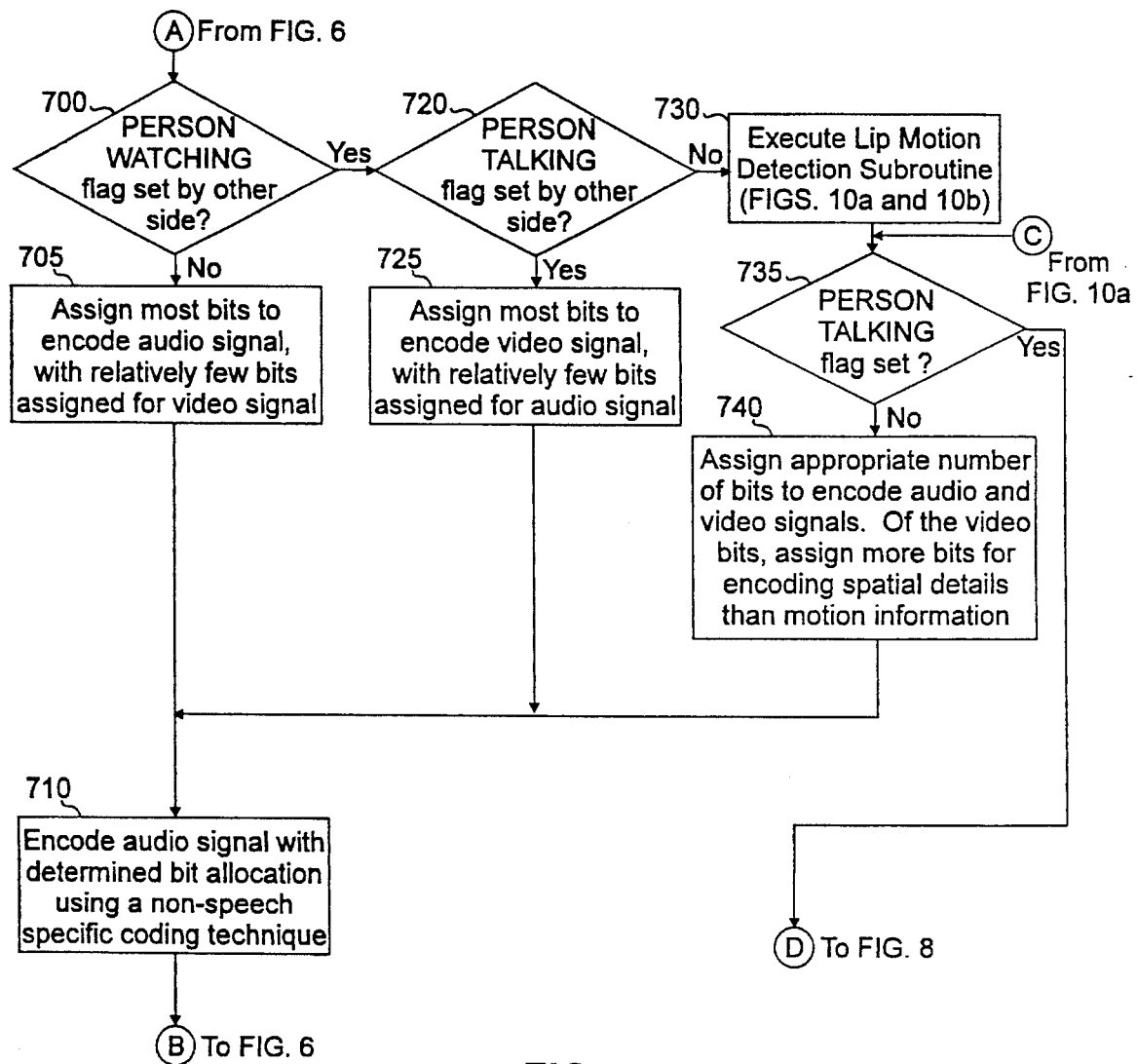
Figure 8:
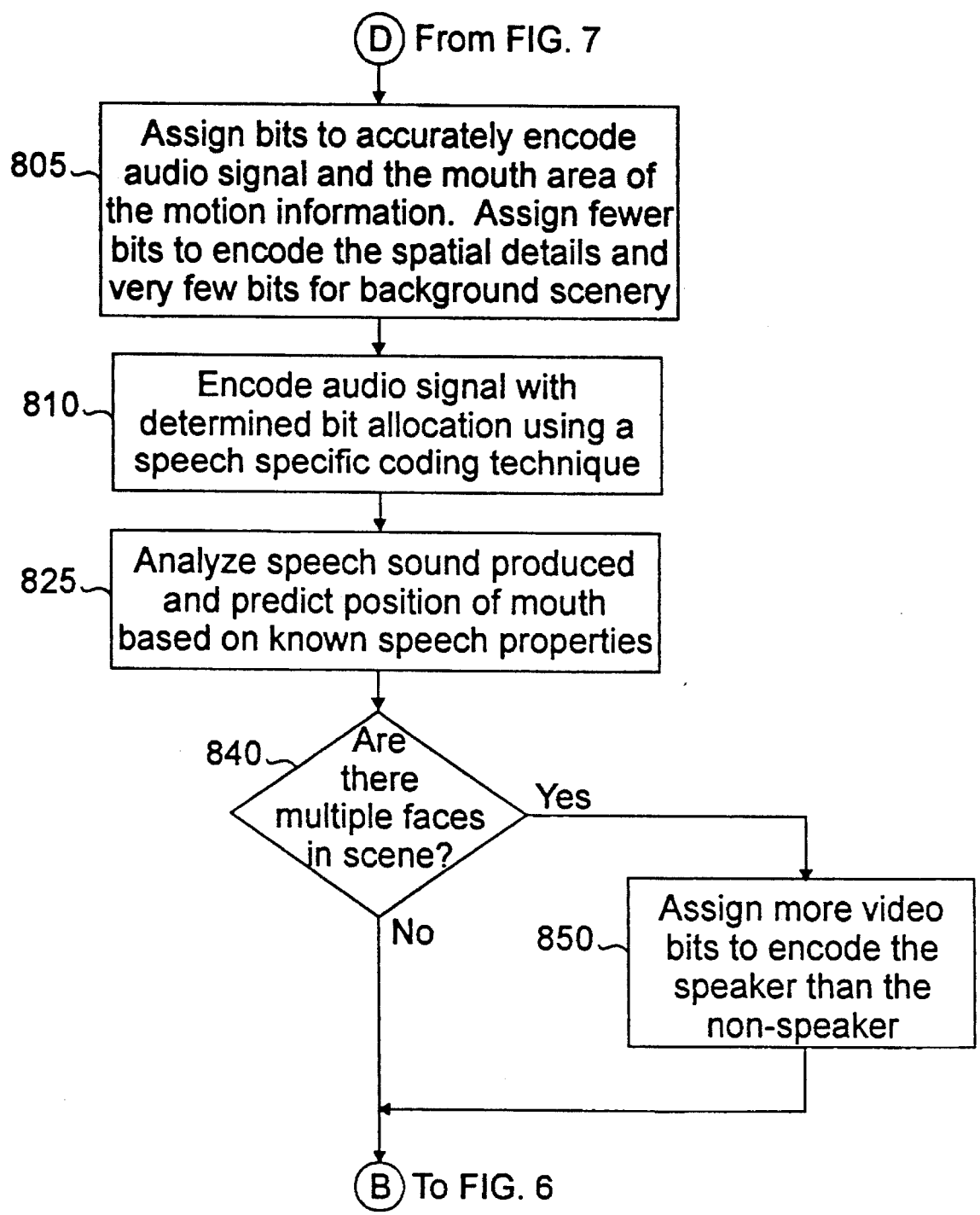

The total number of video bits which may be utilized by the video encoder 30 in encoding a particular frame, and the manner in which the total number of video bits should be further allocated to particular features of the video frame, is determined by the dynamic bit allocator 80, employing a dynamic bit allocation and encoding process, illustrated in FIGS. 6 through 8.

Although the video encoder 30 is illustrated below as a three-dimensional subband image coding technique, it is to be understood that the invention can also be applied using other video coding techniques, such as motion-compensated DCT image coding techniques, as would be apparent to one skilled in the art. One example of a motion-compensated DCT image coding technique is the well-known MPEG encoding standard, developed by the Moving Pictures Experts Group (MPEG), part of a joint technical committee of the International Standards Organization (ISO) and the International Electrotechnical Commission (IEC). The MPEG encoding standard is set forth in ISO-IEC JTC1/SC29/WG11/602 Committee Draft, November 1993, incorporated herein by reference.

As shown in FIG. 1, an audio encoder 60 is preferably configured to receive a digital audio signal from an audio input source 50, which may be comprised of a microphone and an analog-to-digital converter. The audio encoder 60, illustrated in FIG. 1, preferably employs known variable-rate audio encoding schemes in order to facilitate the dynamic allocation of audio bits. For a discussion of suitable audio encoding schemes, see Jose M. Tribolet and Ronald E. Crochiere, "Frequency Domain Coding of Speech," IEEE Transactions on Acoustics, Speech, and Signal Processing, Vol. 27, No. 5, pp. 512–30 (October 1979), incorporated herein by reference.

As discussed further below, the audio encoder 60 preferably utilizes a known speech specific coding algorithm, which takes advantage of known properties of speech to improve the quality of encoded voice signals, to encode the audio signal When a person is known to be speaking. In addition, the audio encoder 60 preferably utilizes a more general non-speech specific coding algorithm to encode audio activity that is not necessarily a person speaking, such as music or background noise. Finally, the audio encoder 60 preferably utilizes a known comfort noise audio encoding technique to encode the audio signal when no audio activity is detected. As is known, comfort noise audio encoding and decoding techniques reproduce noise characteristics that are comfortable to a human ear, utilizing a very low bit rate, such as 1 Kbps (kilobits per second).

The total number of audio bits which may be utilized by the audio encoder 60 in encoding the audio signal, and the particular audio encoding technique which should be utilized, is determined by the dynamic bit allocator 80, employing the dynamic bit allocation and encoding process, illustrated in FIGS. 6 through 8 and described further below.

As discussed further below, the dynamic bit allocator 80 preferably utilizes an object locator 85 to analyze the video information and identify the location of the facial region of each person in the videotelephone scene, as well as the location of the mouth area of the speaker. The object locator 85 may be embodied as a processor implementing a face location detection subroutine, discussed below in conjunction with FIG. 12, and a lip motion detection subroutine, discussed below in conjunction with FIGS. 10*a* and 10*b*. Each of these detected regions are then preferably modelled with an ellipse, in a manner described further below. The dimensions and orientation of each modelled ellipse are defined by a major axis a, a minor axis b and an angle, $\alpha$, between the major axis and a vertical line. In addition, the position of each modelled ellipse within each video frame is defined by a center pixel value.

In a preferred embodiment, the dynamic bit allocator 80 will store the necessary information associated with each person participating in the video teleconference in a speaker data base 300, shown schematically in FIG. 1 and discussed further below in conjunction with FIG. 3. The information stored in the speaker data base 300 may include the dimensions and orientation of the modelled ellipses associated with each person.

Figure 2:
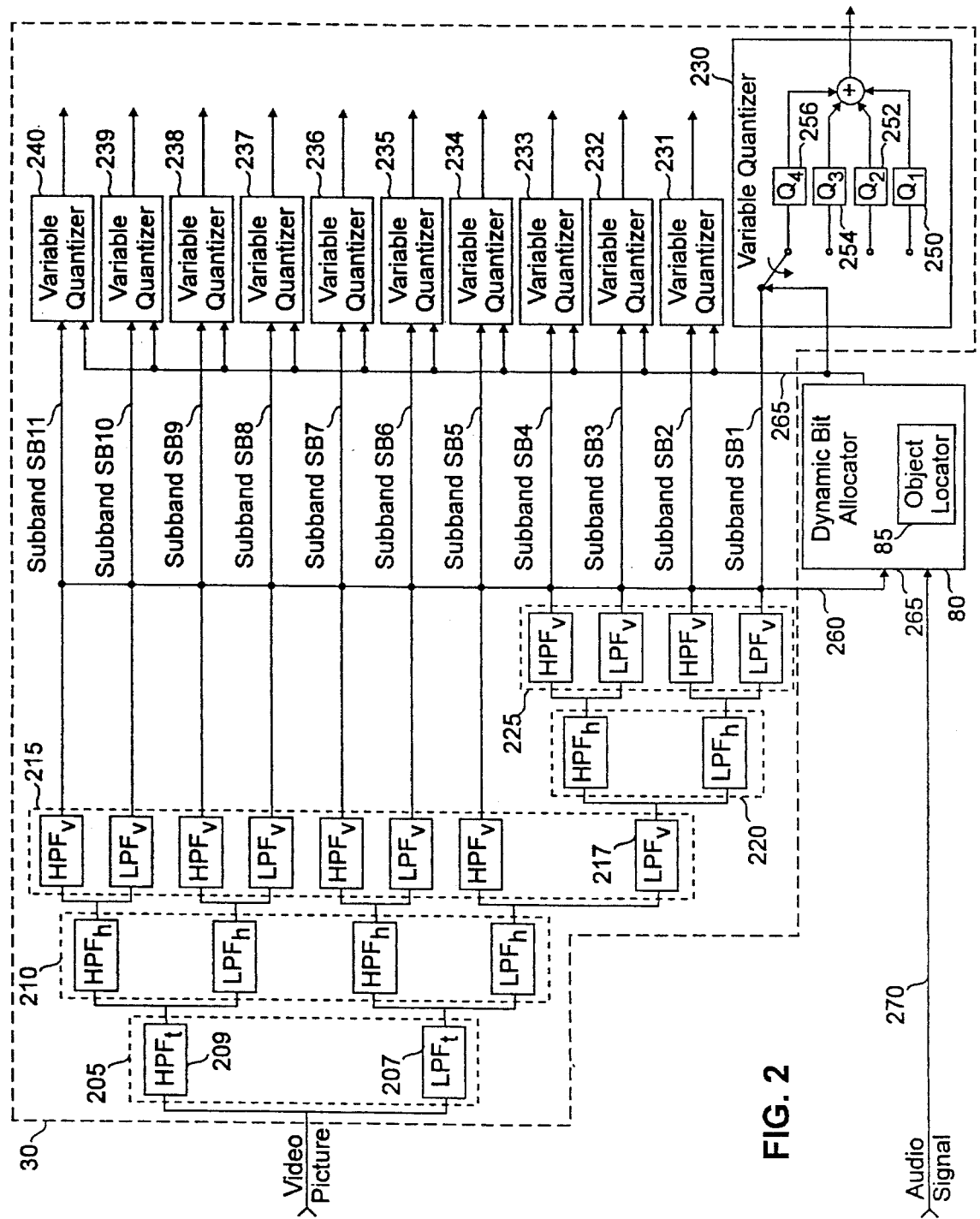
FIG. 2 is a schematic block diagram illustrating a video encoder, embodied as a three-dimensional subband image coder, and the interrelationship of the video encoder with a dynamic bit allocator.

An illustrative video encoder 30, employing a three-dimensional subband image coding system having eleven spatial-temporal subbands, is shown in FIG. 2. For a detailed discussion of a three-dimensional subband image coding system, see the references incorporated above.

Generally, as shown in FIG. 2, the video picture is first temporally filtered by a temporal filter bank 205, consisting of a low pass temporal filter 207 and a high pass temporal filter 209, yielding a low temporal frequency band and a high temporal frequency band, respectively. Thereafter, each of the two temporal frequency bands are horizontally spatially filtered by a filter bank 210 and then vertically spatially filtered by a filter bank 215, yielding eight spatial-temporal frequency subbands, in a known manner. The frequency subband having low temporal and low spatial frequencies, in other words, the signal at the output of low pass filter 217, is thereafter further horizontally filtered by a filter bank 220 and vertically filtered by a filter bank 225, yielding four additional subbands, labelled subbands SB1 through SB4.

As is well-known, subbands SB1 through SB4 exhibit a strong temporal domain correlation, consisting essentially of still or slow moving objects, and therefore carry most of the information about the spatial details. Thus, by accurately encoding subbands SB1 through SB4, the spatial details of the original image data may be emphasized.

In addition, subband SB8, the frequency band having high temporal and low spatial frequencies, often referred to as the "motion subband", acts like a motion detector. Whenever an object moves in the original image sequence, the edges of the object appear in subband SB8. Thus, by accurately encoding subband SB8, the motion information may be emphasized.

It is noted that certain spatial-temporal subbands which lack perceptual importance, such as subbands SB5 through SB7 and subbands SB9 through SB11, may be discarded without a perceptible quality degradation, in order to achieve further bit rate reductions, in a known manner.

As previously indicated, the dynamic bit allocator 80 will allocate bits between the audio and video signals according to the masking rules outlined above, which are implemented by a dynamic bit allocation and encoding process, described further below in conjunction with FIGS. 6 through 8. In addition, the dynamic bit allocator 80 will further allocate the video bits in order to emphasize particular features of each video frame.

As shown in FIG. 2 and discussed further below, the dynamic bit allocator 80 will receive the various spatial-temporal frequency subbands via input line 260 and the audio signal via input line 270 in order to analyze the audio and video information and thereby identify certain features which may be present in the video frame. As discussed further below, the dynamic bit allocator 80 will utilize a model-assisted dynamic bit allocation in order to more accurately encode certain features that are typically present in a videotelephone picture.

As previously indicated, the most likely object of interest to a viewer in a videotelephone scene is the face, and particularly the mouth area, of the other party to the videotelephone communication. Thus, in a preferred embodiment, the dynamic bit allocator 80 will utilize the object locator 85, discussed further below, to analyze the video information and identify the location of the facial region of each person in the videotelephone scene, as well as the location of the mouth area of the speaker. Each of these detected regions are then preferably modelled with an ellipse having a variable size and tilt, in a manner described further below. In this manner, the video encoder 30 may thereafter encode the modelled regions with greater accuracy than other regions of the video frame.

Specifically, the dynamic bit allocator 80 will preferably allocate more video bits to encode the facial region of each person detected in a videotelephone scene than to encode other features of the scene. In addition, when there are multiple faces in the scene of a videotelephone application, the speaker's face should be encoded with greater accuracy than other faces in the video scene. Further, when a person is known to be talking, the dynamic bit allocator 80 will allocate even more of the video bits to encode the speaker's mouth area than the remainder of the speaker's facial region.

Thus, according to one feature of the invention, each video frame, typically comprised of head-and-shoulder shots of one or more persons, is preferably encoded with a number of different accuracy levels in order to enhance perceptual quality and maximize bit rate efficiency. Preferably, each video scene is encoded according to the following hierarchy, from greater to lesser accuracy: the speaker's mouth area, the remainder of the speaker's facial region, the facial regions of other persons in the scene, if any, and finally, the remainder of the video scene is encoded with the least level of detail.

Thus, as shown in FIG. 2, a variable quantizer, such as variable quantizers 230–240, is preferably provided for quantizing each subband with a variable level of detail. Variable quantizer 230, associated with subband SB1, is shown for illustrative purposes in greater detail. In order to accurately encode the mouth area of a person who is believed to be speaking with the greatest degree of accuracy, each variable quantizer, such as the variable quantizer 230, will include a fine quantizer 250, $Q_1$, for quantizing image data inside the modelled ellipse representing the mouth area of the speaker.

In addition, in order to encode the facial region of the speaker with a lower level of accuracy, an intermediate quantizer 252, $Q_2$, is provided for quantizing image data that is outside the modelled ellipse representing the mouth area of the speaker and inside the modelled ellipse representing the facial region of the speaker. It is noted that if no one in the scene is speaking, the intermediate quantizer 252, $Q_2$, may be utilized to quantize the image data that is inside the modelled ellipse representing the facial region of each person in the video scene.

In order to encode the facial region of non-speakers in the scene, if any, when there is a person speaking with yet a lower level of accuracy, a quantizer 254, $Q_3$, is provided for quantizing the image data that is inside the modelled ellipses representing the facial regions of non-speakers in the scene. Finally, in order to encode the remainder of the scene with the least degree of accuracy, a course quantizer 256, $Q_4$, is provided for quantizing image data that is outside the modelled ellipses representing the facial regions of persons in the scene.

Each variable quantizer 230–240 is preferably configured to receive a signal from the dynamic bit allocator 80 via data line 265 in order to selectively utilize quantizers $Q_1$, $Q_2$, $Q_3$ and $Q_4$ in the four areas of the subband signals delimited by the modelled ellipses representing the mouth area and facial region of the speaker and the facial region of non-speakers, if any, as discussed above.

According to a further feature of the present invention, discussed further below, the dynamic bit allocator 80 will preferably analyze each video frame to be encoded in order to evaluate the significance of motion information that may be present in the videotelephone scene. Specifically, if it is determined that there is little motion information of interest in the videotelephone frame, such as where the lips of the persons in the scene are not moving, the dynamic bit allocator 80 will preferably emphasize the spatial details over the motion information by allocating more bits to subbands SB1 through SB4 than to the motion subband, SB8.

If, however, it is determined that there is significant motion information of interest in the videotelephone frame, such as where the lips of one or more persons in the videotelephone scene are moving, the dynamic bit allocator 80 will preferably emphasize the motion information over the spatial details by allocating additional bits to the motion subband, SB8.

The emphasis of motion information or spatial details may be implemented, for example, by allowing the one or more subbands to be emphasized to encode the video image using the full range of quantizers 250, 252, 254, 256 present in the associated variable quantizer, such as the variable quantizer 230. The subbands that are not being emphasized are limited to encoding the video image using only the course quantizers, such as quantizers 254, 256 that are present in the associated variable quantizer, such as the variable quantizer 230.

Once each subband has been quantized by the variable quantizers 230–240 according to the above strategies, each subband may undergo entropy coding, in a known manner, to further remove statistical redundancy from the video signal. Thereafter, the compressed video signal is multiplexed with the compressed audio signal by the multiplexer 45, as shown in FIG. 1.

As illustrated in FIG. 3, the speaker data base 300 can be visualized as a two-dimensional array of data, with an identification for each speaker providing the headings for each row, such as rows 315 and 318, and the particular data maintained for each speaker providing the headings for each column.

The speaker data base 300 will preferably have a plurality of columns for storing the parametric information associated with the modelled face ellipse representing each person participating in the video teleconference, such as a major axis column 325, a minor axis column 327, an angle, $\alpha$, column 330 and a center pixel column 332. In a preferred embodiment, each entry in columns 325, 327, 330 and 332 for storing the facial ellipse parameters will contain two cells. A first cell in each entry preferably stores a reference value for the corresponding ellipse parameter, as measured during an initialization procedure, discussed below, such as the cell 360*a* which stores the major axis reference value. A second cell in each entry preferably stores the current measured value of the corresponding ellipse parameter, as measured during the most recently encoded video frame, such as the cell 360*b* which stores the current measured value of the major axis.

It is noted that the major axis value of the face ellipse presented in column 325 is listed as a vertical pixel length based on a video display having a size of 360×288 pixels. Similarly, the minor axis value of the face ellipse presented in column 327 is listed as a horizontal pixel length value.

In addition, the speaker data base 300 will preferably have a plurality of columns for storing the current measured values corresponding to the parametric information associated with the modelled lip ellipse representing the mouth area of each person, such as a major axis column 335, a minor axis column 337, an angle, $\alpha$, column 340 and a center pixel column 342. It is noted that the major axis value of the lip ellipse presented in column 335 is listed as a horizontal pixel length based on a video display having a size of 360×288 pixels. Similarly, the minor axis value of the lip ellipse presented in column 335 is listed as a vertical pixel length value.

In a preferred embodiment, discussed further below, the speaker data base 300 will also include columns 345 and 350 for maintaining flags indicating whether the associated person is currently present in the scene and whether the associated person is currently talking, respectively.

The speaker data base 300 illustrated in FIG. 3 has been populated with the information associated with two persons, A and B, currently present in the video scene. As indicated in the entries in column 350 of the speaker data base 300, person A is speaking, and person B is not speaking. The reference values and current measured values corresponding to the parameters of the modelled face ellipses for persons A and B are indicated in columns 325, 327, 330 and 332. The current measured values corresponding to the parameters of the modelled lip ellipses for persons A and B are indicated in columns 335, 337, 340 and 342.

It is noted that some or all of the information that is shown for illustrative purposes as being stored in the collective speaker data base 300, may alternatively be stored in registers or other distributed memory locations, as would be apparent to one skilled in the art.

Figure 4:
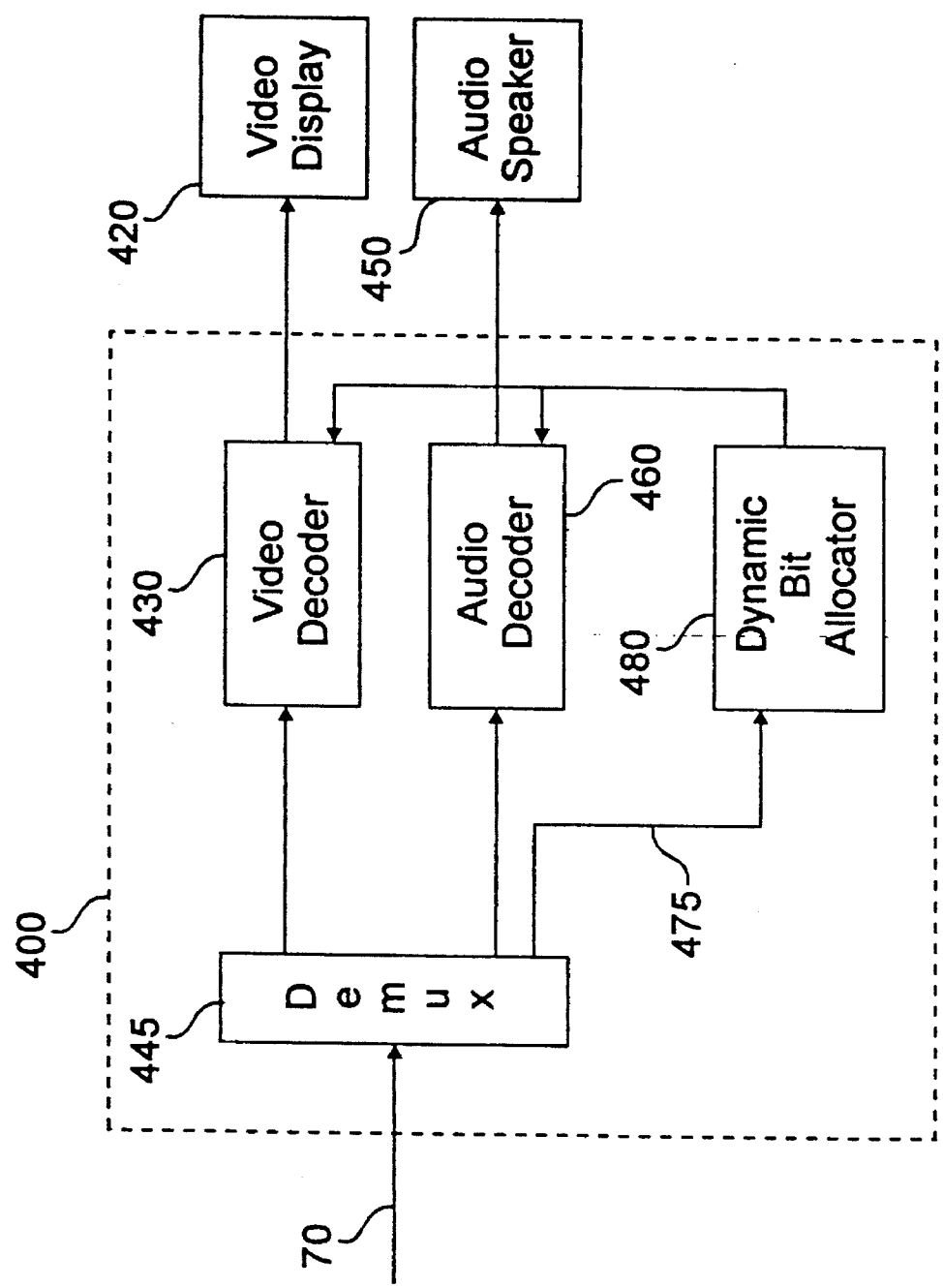
FIG. 4 is a schematic block diagram illustrating a receiver for a low bit rate audio-visual communication system according to the present invention.

As shown in FIG. 4, the receiver 400, associated with the second party to the videotelephone communication, will receive the encoded audio and video signals via the digital channel 70 for presentation to the second party. In addition to receiving the encoded audio and video signals, the receiver 400 will also receive side information from the transmitter 10 for each frame in order to maintain consistency between the encoding performed by the transmitter 10 and the decoding performed by the receiver 400. The side information for a given frame may include, for example, an indication of the particular encoding techniques utilized to encode the audio or video information, the allocation of audio and video bits utilized by the transmitter 10 for the current frame, and the manner in which the video bits are allocated to certain features of a video frame, including an indication of the parameters of the modelled ellipses representing various features of the video scene.

In one embodiment, a number of predefined encoding schemes, identified by an index number, can be established to provide combinations of specific encoding techniques and bit allocations. In this manner, the side information that is transmitted to the receiver 400 can be limited to the index number that identifies the appropriate encoding scheme, as well as the parameters of any modelled ellipses.

As shown in FIG. 4, the receiver 400 utilizes a demultiplexer 445 to demultiplex the received audio and video signals. A video decoder 430 is preferably configured to receive the demultiplexed compressed video signal from the demultiplexer 445 for decoding the video signal for presentation to the second party by means of a video display 420. Similarly, an audio decoder 460 is preferably configured to receive the demultiplexed compressed audio signal from the demultiplexer 445 for decoding of the audio signal for presentation to the second party by means of an audio speaker 450. The dynamic bit allocator 480 will receive the transmitted side information via data line 475 in order to provide the video decoder 430 and audio encoder 460 with the information that is needed to accurately decode the received compressed signals.

Although the transmitter and the receiver are illustrated as distinct pieces of equipment, it is understood that, typically, the transmitter and receiver are embodied as a single integrated system, commonly referred to as a codec.

Figure 5:
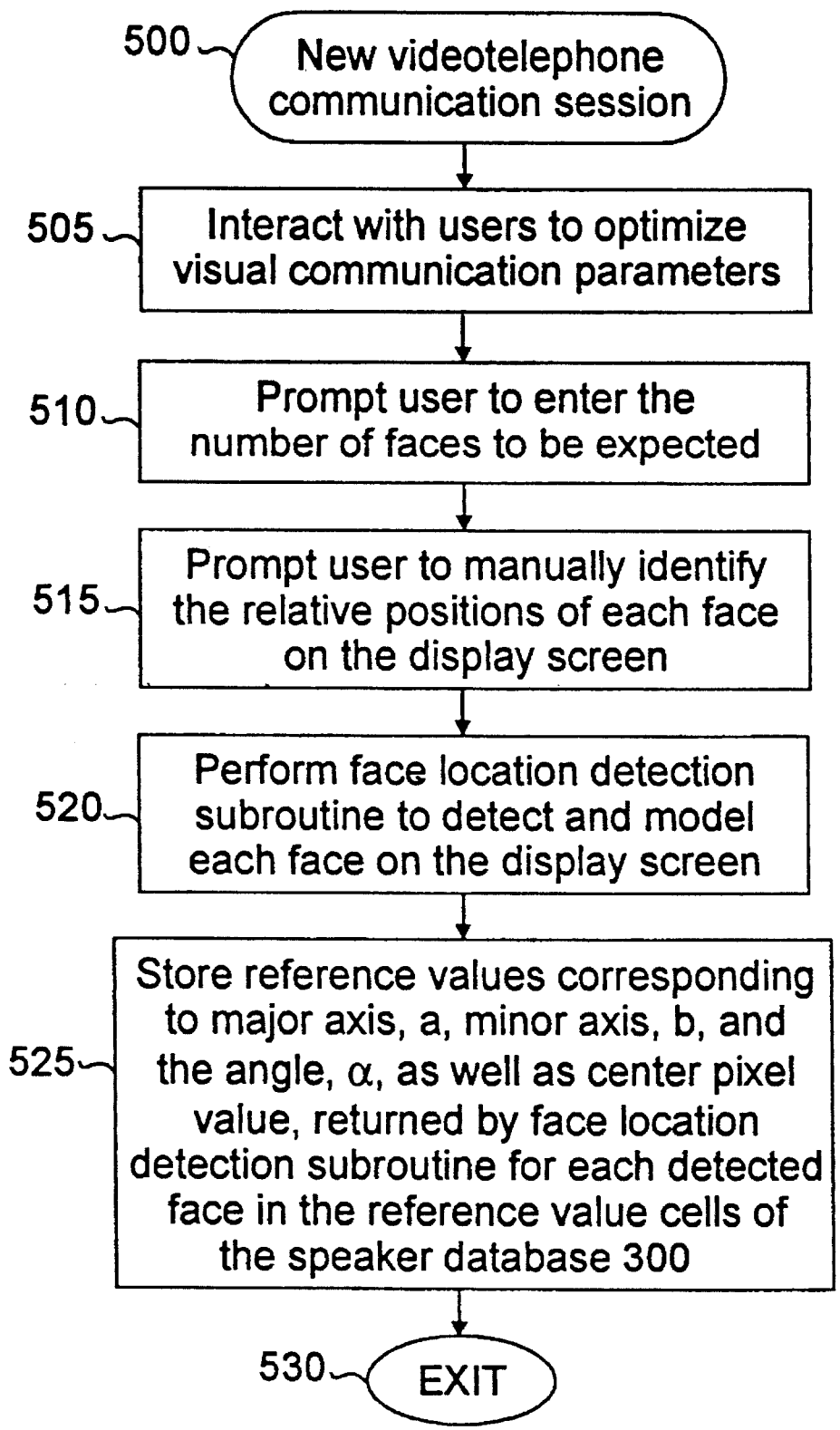
FIG. 5 is a flow chart describing an exemplary initialization process according to the present invention, as utilized by a transmitter prior to a videotelephone communication session.

At the beginning of each videotelephone communication session, an initialization process, such as the one illustrated in FIG. 5, is preferably implemented by the video teleconferencing system of each party before visual communication begins. The initialization process will be entered at step 500 and will interact with the respective parties during step 505 to optimize visual communication parameters, such as lighting conditions, camera focus and the relative position of the users, in a known manner. In addition, during step 510, the initialization process will preferably prompt the party to enter the number of faces to be expected to appear in the videotelephone communication. The party will then preferably be prompted to manually identify the relative positions of each face on the respective display screen during step 515, for example, by pointing and clicking to each facial region with a mouse or other graphical input device.

Thereafter, the initialization process will utilize the object locator 85 to perform a face location detection subroutine during step 520, such as the one discussed below in conjunction with FIG. 12, in the area surrounding each of the manually identified face positions entered during step 515 in order to detect and model each face present in the videotelephone scene. As previously indicated, the face location detection subroutine will preferably model each detected face with an ellipse having a variable size and tilt.

Figure 12:
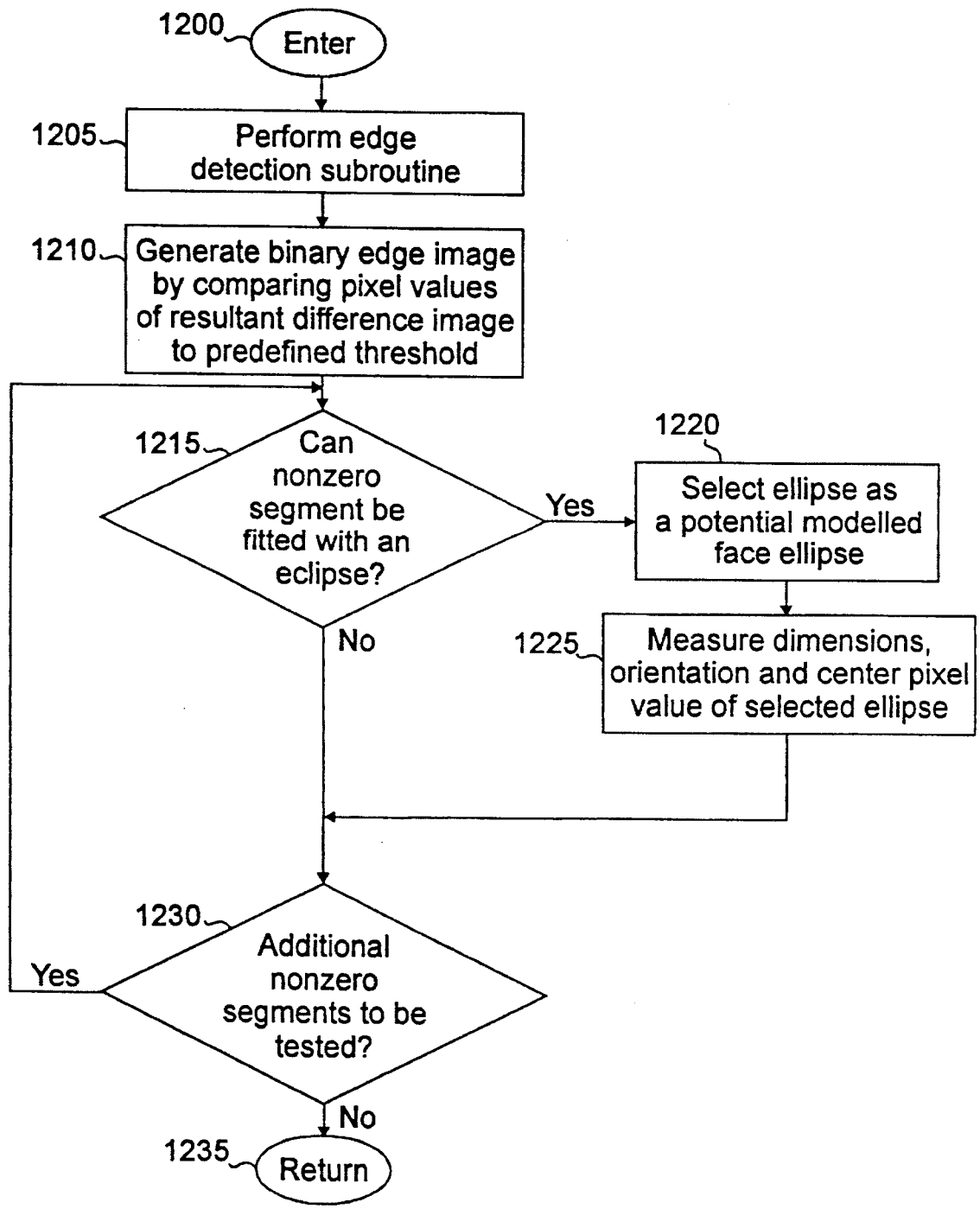
FIG. 12 is a flow chart describing an exemplary face location detection subroutine according to the present invention, as utilized by the initialization process of FIG. 5 and the speaker location identification subroutine of FIG. 9.

As shown in FIG. 12, the face location detection subroutine will be entered during step 1200. It is noted that since the lighting conditions have preferably been optimized during step 505 of the initialization process, the faces of the persons in the video scene may be assumed to be properly illuminated. Thus, there will be a detectable contrast between the intensity of the faces in the video scene and the background scenery.

The face location detection subroutine will identify the faces present in a scene by initially performing an edge detection subroutine during step 1205 to identify the edges in the image, or, in other words, the boundaries at which a significant change in intensity occurs. For a discussion of suitable edge detection subroutines, see S. Ghosal and R. Mehrotra, "Detection of Composite Edges," I.E.E.E. Trans Image Processing, vol. 3, no. 1, pp. 14–25 (Janurary 1994); V.S. Nalwa and T.O. Binford, "On Detecting Edges, " I.E.E.E. Trans Pattern Analysis and Machine Intelligence, vol. 8, no. 6, pp. 699–714 (Novvember 1986), each incorporated herein by reference.

In general, the edge detection subroutine performed during step 1205 will typically generate a difference image by spatially subtracting neighboring image samples in a subband emphasizing spatial details, such as subband SB1. The resultant difference image will represent the degree of intensity changes.

The face location detection subroutine will then compare during step 1210 the pixel values of the resultant difference image against a predefined threshold in order to yield a binary edge image. Nonzero pixel values in the binary edge image represent edges in the original video frame. Thereafter, during step 1215, the face location detection subroutine will perform a test in each nonzero segment of the binary edge image in the area surrounding each of the manually identified face positions entered during step 515 to determine if the nonzero segment can be fitted with an ellipse.

If it is determined during step 1215 that the nonzero segment of the binary edge image can be fitted with an ellipse, the face location detection subroutine will select that nonzero segment during step 1220 as a potential modelled ellipse that may be associated with the face of a person. Thereafter, the dimensions and orientation of each modelled face, as well as a center pixel value which defines the position of the modelled ellipse on the display screen, are measured during step 1225.

If, however, it is determined during step 1215 that the nonzero segment of the binary edge image cannot be fitted with an ellipse, program control will proceed to step 1230. A test is performed during step 1230 to determine if there are additional nonzero segments in the binary edge image to be tested.

If it is determined during step 1230 that there are additional nonzero segments to be tested, program control will return to step 1215 and continue in the manner described above. If, however, it is determined during step 1230 that there are no additional nonzero segments that remain to be tested, program control will proceed to step 1235, wherein the face location detection subroutine will return to the initialization process at step 525 (FIG. 5). The values of the measured dimensions, orientation and center pixel value of each modelled face ellipse are returned to the initialization process.

During step 525, the returned reference values corresponding to the major axis a, the minor axis b and the angle, α, as well as the center pixel value, of each modelled ellipse are stored in the reference value cells in columns 325, 327, 330, 332, respectively, of the speaker data base 300, illustrated in FIG. 3. As discussed further below, the reference dimension and orientation information that has been stored in the speaker data base 300 during step 525 will facilitate later face location searches performed for the encoding of each video frame, since it will be unnecessary to search for faces of all sizes. After performance of the step 525, the initialization process will be exited during step 530.

The entry of the number of expected faces and the manual identification of their relative positions during steps 510 and 515, respectively, reduces the complexity of the face location detection subroutine performed during step 520, by limiting the area to be searched. However, steps 510 and 515 need not be performed if the face location detection subroutine is completely automated with a predefined threshold, in a known manner.

As illustrated in FIGS. 6 through 8, a dynamic bit allocation and encoding process will be entered at step 600 by each transmitter 10 for each video frame and associated audio information to be encoded for transmission. As discussed further below, the dynamic bit allocation and encoding process will evaluate the current content of the audio and video information and allocate the available bits among the audio and video signals. This process will also further allocate the video bits among particular features of the video frame, and select an appropriate audio encoding technique.

The input video signal will be filtered during step 605 in order to divide the input video signal into the various spatial-temporal frequency subbands utilized by three-dimensional subband image coding techniques, as illustrated in FIG. 2. It is noted that if a motion-compensated image encoding technique is utilized, a DCT transform of the input video signal would typically be performed during step 605, as opposed to the filtering step performed for a subband image coding system, in a known manner.

Figure 9:
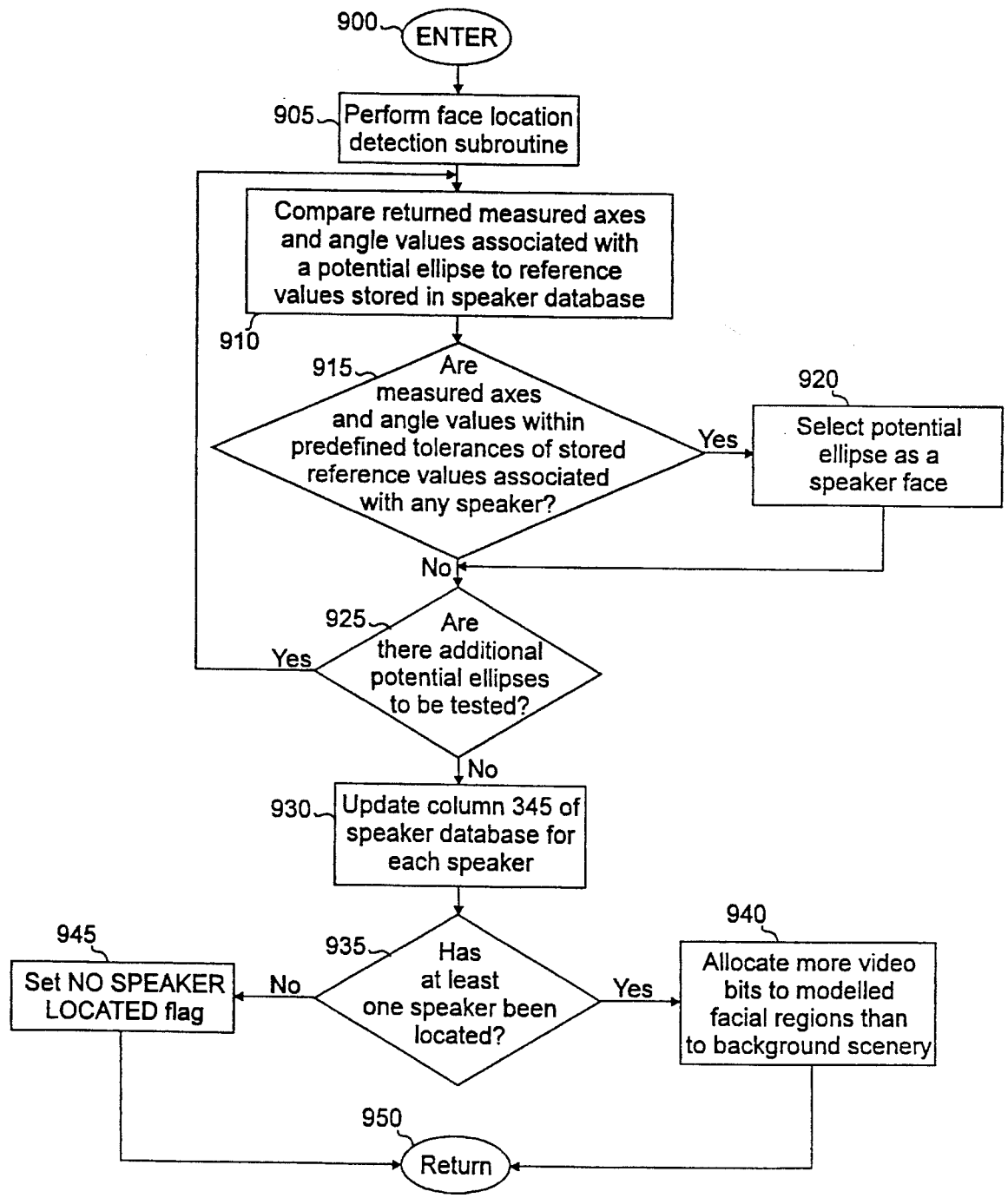
FIG. 9 is a flow chart describing an exemplary speaker location identification subroutine according to the present invention, as utilized by the dynamic bit allocation and encoding process of FIG. 6.

Thereafter, a speaker location identification subroutine, illustrated in FIG. 9, will be executed during step 610. As will be discussed further below, the speaker location identification subroutine will identify and model the location of the facial region of each speaker in a video frame, thereby allowing the modelled facial location to be more accurately encoded.

The speaker location identification subroutine, illustrated in FIG. 9, will be entered at step 900 and will perform a face location detection subroutine during step 905, in the manner described above in conjunction with FIG. 12. The face location detection subroutine will identify potential ellipses that may be associated with the facial regions of a speaker. For each identified potential ellipse, the speaker identification subroutine will determine if the identified potential ellipse is associated with a particular speaker.

The speaker identification subroutine will compare during step 910 the returned measured parametric values, such as the major and minor axes, a and b, and the angle, α, of an identified potential ellipse to the reference values stored in columns 325, 327, 330, respectively, in the speaker data base 300 for each speaker. In a preferred embodiment, a reduction of computational complexity is achieved during step 910 by assuming that the angle, α, is close to zero and then comparing the measured values of the major and minor axes, a and b, to the stored reference values.

A test is performed during step 915 to determine if the measured parametric values of the potential ellipse are within predefined tolerances of the reference values stored in columns 325, 327, 330 of the speaker data base 300 for any person. If it is determined during step 915 that the measured potential ellipse values are within the predefined tolerances of the stored reference values, the potential ellipse is selected as being associated with that person during step 920.

A test is performed during step 925 to determine if there are any additional potential ellipses to be tested. If it is determined during step 925 that there are additional potential ellipses to be tested, program control will return to step 910, and proceed in the manner described above. If, however, it is determined during step 925 that there are no additional potential ellipses to be tested, program control will proceed to step 930.

The entry in column 345 of the speaker data base 300, which contains a flag indicating whether or not the associated speaker is currently present in the scene, is updated during step 930 for each speaker. Thereafter, a test is performed during step 935 to determine if at least one speaker has been located during the current execution of the speaker location identification subroutine.

If it is determined during step 935 that at least one speaker has been located, the dynamic bit allocator 80 will preferably allocate more of the video bits, the total value of which remains to be determined, to the modelled facial regions than to other features of the video scene, such as the background scenery or other spatial details, during step 940. Thereafter, during step 950 program control will return to the dynamic bit allocation and encoding process at step 612 (FIG. 6).

If, however, it is determined during step 935 (FIG. 9) that no speakers have been located, a NO SPEAKER LOCATED flag will be set during step 945. The NO SPEAKER LOCATED flag may be utilized to indicate to the other party that this party is most likely not watching the display screen, as discussed further below. Thereafter, during step 950, program control will return to the dynamic bit allocation and encoding process at step 612 (FIG. 6).

In a preferred embodiment, the "person talking" entries in column 350 of the speaker data base 300, and a PERSON TALKING flag, are preferably initialized during step 612 to indicate that the persons on this side of the communication are not currently speaking. As discussed further below, the PERSON TALKING flag may be utilized to indicate to the other party whether anyone on this side of the videotelephone communication is most likely talking at the time the frame is encoded.

The dynamic bit allocation and encoding process will monitor the audio signal being generated by the audio input source 50 and perform a test during step 615 to determine if there is any audio activity, such as when the amount of audio energy exceeds a defined threshold. If it is determined during step 615 that there is no audio activity, including speech, music or audible background noise, there is no need to accurately encode the audio signal.

Thus, the dynamic bit allocator 80 will assign relatively few bits to encode the audio signal during step 620. In this manner, most of the available bits may be assigned by the dynamic bit allocator 80 to encode the video image, in order to ensure good video quality. In addition, since the scene is quiet, it may be assumed that the party on this side of the videotelephone communication is most likely sitting still and listening. Therefore, there is probably little motion present in the current scene. Accordingly, more of the video bits are preferably assigned during step 620 to encode the spatial details and slow moving components of the video image than are assigned to encode the rapid motion information.

For example, if the videoteleconferencing system is operating at a bit rate of 16 Kbps, a typical bit allocation during step 620 would assign 1 Kbps for encoding the comfort noise audio signal and 15 Kbps for encoding the video signal. Of the 15 Kbps allocated for encoding the video signal, preferably 13 Kbps are assigned to subbands SB1 through SB4 for encoding the spatial details and 2 Kbps are assigned to subband SB8 for encoding the modelled face regions in the motion subband. Of the 13 Kbps assigned to subbands SB1 through SB4, 8 Kbps are preferably further allocated for encoding the modelled face ellipse region and 5 Kbps are preferably allocated for encoding the background scenery outside the modelled face ellipse.

Since there is no significant audio activity to encode, a known comfort noise audio encoding technique is utilized during step 625 to encode the audio signal with the audio bits allocated during step 620 for transmission to the other party for generating a noise signal that is comfortable to the human ear.

Thereafter, each of the retained spatial-temporal frequency subbands are quantized during step 630 using the video bit allocations determined above, in the manner described above in conjunction with FIG. 2.

As discussed further below, it is possible to determine from the video images whether there is a person in front of the camera, and, if so, whether the person is looking in the general direction of the associated display screen. If it is determined that there is not at least one person most likely watching the display screen, there is no need for the transmitter of the other party to transmit their video signal in much detail.

The dynamic bit allocation and encoding process will perform a subroutine during step 635 for determining if at least one person is most likely watching the associated display screen at the time the frame is encoded. The subroutine performed during step 635 is discussed below in conjunction with FIG. 11 and is hereinafter referred to as the person watching subroutine. If the person watching subroutine determines that at least one person is most likely watching the display screen, a PERSON WATCHING flag will be set.

The encoded audio and video signals are multiplexed and transmitted to the receiver 400 during step 640, along with the PERSON TALKING flag, the PERSON WATCHING flag, and the appropriate side information associated with the current frame. Thereafter, the dynamic bit allocation and encoding process will be exited at step 650.

If, however, it is determined during step 615 that there is audio activity being generated by this party, which may consist of speech, music or audible background noise, program control will proceed to step 700, illustrated in FIG. 7, in order to identify an appropriate audio encoding algorithm and bit allocation to be utilized.

A test is performed during step 700 (FIG. 7) to determine if the received PERSON WATCHING flag that was transmitted by the other party to the communication with their latest audio and video information has been set. If it is determined during step 700 that the received PERSON WATCHING flag has not been set, the other party is most likely not watching their display screen, so there is no need for the transmitter 10 of this party to encode the video signal with great accuracy. Thus, the dynamic bit allocator 80 will assign relatively few bits to encode the spatial details of the video signal during step 705, with most of the available bits being assigned to encode the audio signal, in order to ensure good audio quality.

For example, if the videoteleconferencing system is operating at a bit rate of 16 Kbps, a typical bit allocation during step 705 would assign 13 Kbps for encoding the audio signal and 3 Kbps for encoding the spatial details in subbands SB1 through SB4 of the video signal.

The audio signal will be encoded during step 710 with the audio bits allocated during step 705 using a non-speech specific audio encoding technique, since the content of the audio signal is unknown and there are sufficient audio bits available to ensure high quality. As discussed above, a non-speech specific audio encoding algorithm ensures a high quality audio signal when the audio activity is not necessarily associated with a person speaking, such as music or background noise.

Thereafter, program control will proceed to step 630 (FIG. 6) in order to encode the video signal by quantizing each of the retained spatial-temporal frequency subbands using the determined video bit allocations, and continues in the manner described above.

If, however, it is determined during step 700 that the PERSON WATCHING flag received from the other party has been set, the other party is likely watching the display screen and program control will proceed to step 720. As discussed further below, it is possible to determine from the audio and video information whether at least one person is most likely talking at the time the frame is encoded, such as where a person is moving their lips when there is audio activity. If it is determined that at least one person is most likely talking, the speaker cannot effectively listen at the same time. Thus, when it is determined that a first party to the communication is most likely speaking, there is no need for the transmitter associated with the second party to transmit the audio signal in much detail.

As discussed further below, as each frame of video and associated audio information is encoded, the dynamic bit allocation and encoding process preferably performs a lip motion detection subroutine during step 730 which will set a PERSON TALKING flag if it is determined that at least one person on the respective side of the videotelephone communication is most likely talking at the time the frame is encoded. The PERSON TALKING flag is then transmitted to the other party along with the encoded audio and video signals during step 640, as indicated above.

Thus, a test is performed during step 720 to determine if the PERSON TALKING flag received from the other party to the communication with the latest audio and video information has been set. If it is determined during step 720 that the received PERSON TALKING flag has been set, the other party is most likely talking. Since the other party is likely talking, they are most likely not listening to the first party and there is, therefore, no need for the transmitter 10 associated with the first party to encode the audio signal with great accuracy. Thus, the dynamic bit allocator 80 will assign relatively few bits to encode the audio signal during step 725, with most of the available bits being assigned to encode the video signal, in order to ensure good video quality.

For example, if the videoteleconferencing system is operating at a bit rate of 16 Kbps, a typical bit allocation during step 725 would assign 4 Kbps for encoding the audio signal and 12 Kbps for encoding the video signal. Of the 12 Kbps allocated for encoding the video signal, preferably 9 Kbps are assigned to subbands SB1 through SB4 for encoding the modelled face regions and 3 Kbps are preferably assigned to subbands SB1 through SB4 for encoding the background scenery outside the modelled face ellipse. If there is lip motion, however, 2 Kbps are preferably transferred from subbands SB1 through SB4 to subband SB8 for encoding the modelled lip ellipse of the speaker.

Thereafter, the audio signal will be encoded during step 710 with the audio bits allocated during step 725 using a non-speech specific audio encoding technique, and continue in the manner described above.

If, however, it is determined during step 720 that the received PERSON TALKING flag has not been set, the other party is most likely paying attention to the transmitted audio and video information, since they are most likely watching the screen, as detected by step 700, and are most likely not talking at this time, as detected during step 720. Thus, the available bits must be carefully allocated between the audio and video signals in order to achieve maximum quality of the transmitted signals.

Figure 10A:
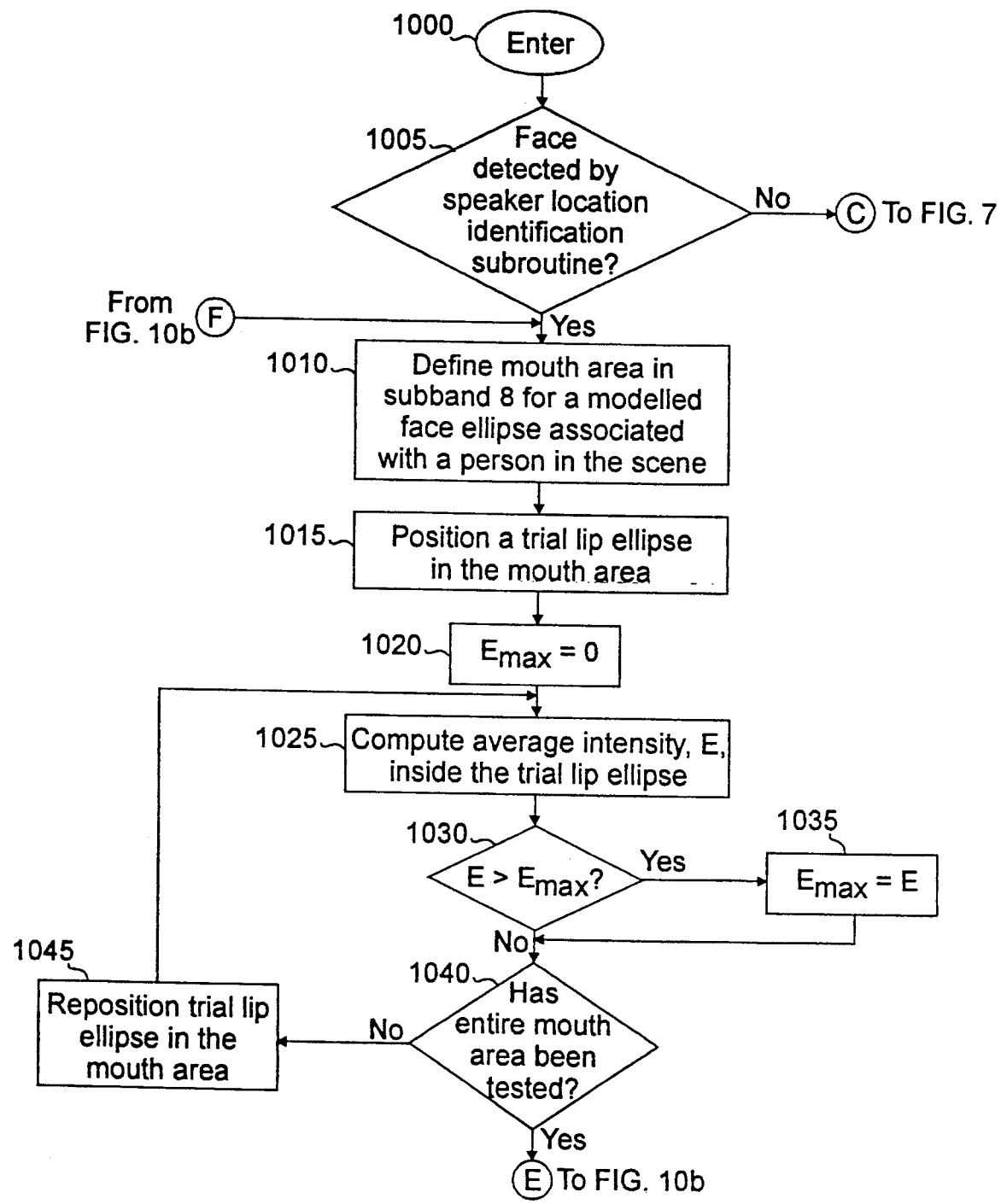
FIGS. 10a and 10b, collectively, are a flow chart describing an exemplary lip motion detection subroutine according to the present invention, as utilized by the dynamic bit allocation and encoding process of FIG. 7.
Figure 10B:
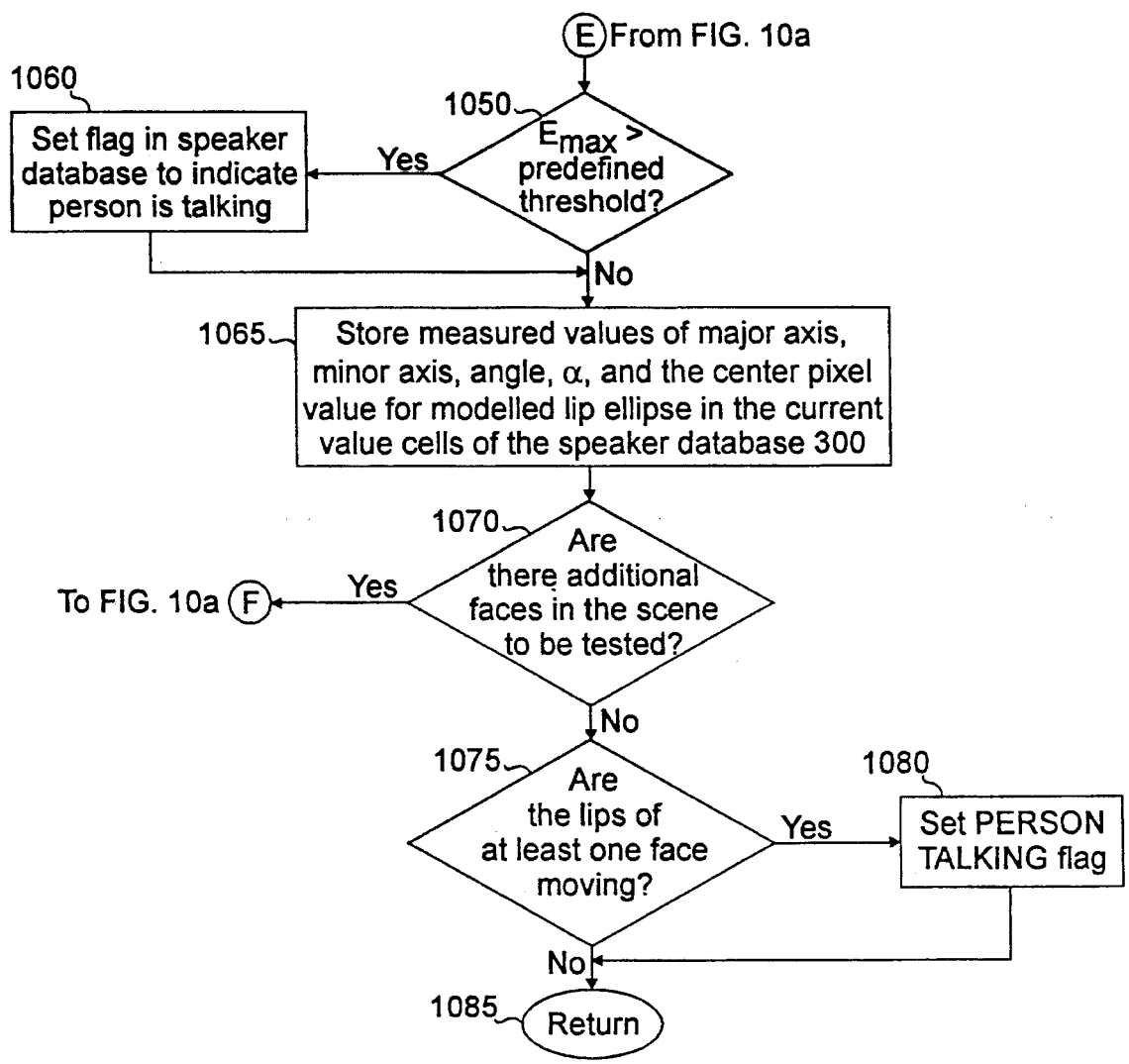

In order to differentiate between speech and music or background noise, the dynamic bit allocation and encoding process preferably performs a lip motion detection subroutine, illustrated in FIGS. 10*a* and 10*b*, during step 730. If the lip motion detection subroutine determines that the lips of at least one person in the videotelephone scene are moving in the presence of audio activity, it may be assumed that a person is talking.

As illustrated in FIG. 10*a*, the lip motion detection subroutine initially performs a test during step 1005 to determine if a face was detected in the current video frame by the speaker location identification subroutine performed during step 610 (FIG. 6). If it is determined during step 1005 that no faces were detected in the current video frame, there is no reason to perform the lip motion detection subroutine, and program control will return to the dynamic bit allocation and encoding process at step 735.

If, however, it is determined during step 1005 that at least one face was detected in the current video frame, then program control will proceed to step 1010 in order to identify the location of the lips. When a person speaks, their lips, jaw and cheeks are constantly moving, with the motion of the lips, and the change in image intensity between the lips, being the most noticeable. In a preferred embodiment, lips are modelled by a smaller ellipse inside the larger ellipse representing the face of the speaker. In addition, the major axis of the ellipse representing the face of the speaker will be nearly perpendicular to the major axis of the ellipse representing the lips of the speaker.

If the lips of one or more persons in the video scene are moving, the edges of the moving lips will appear in subband SB8, which includes the motion information associated with the video frame. It is noted that for a motion compensated DCT based video coding algorithm, such as the MPEG video coding technique, the motion information consists of motion vectors and predictions. A preferred embodiment of the invention defines the lower half of the modelled face ellipse to be a potential mouth area which contains the lip ellipse. The following sequence of steps searches for the trial lip ellipse in the mouth area having the highest motion activity.

The potential mouth area is defined in subband SB8 during step 1010 for a modelled face ellipse detected by the speaker location identification subroutine during step 610. The mouth area serves as a boundary region for the search that is performed for the lip ellipse. Thereafter, during step 1015, a trial ellipse of proper size and orientation relative to the overall modelled face ellipse is positioned in the mouth area. The maximum average intensity, $E_{max}$, is set to zero during step 1020.

The average intensity, E, corresponding to the average motion activity of the samples inside the trial lip ellipse is computed during step 1025. A test is performed during step 1030 to determine if the measured average intensity corresponding to the current position of the trial lip ellipse is greater than the stored maximum average intensity, in other words $E > E_{max}$. If it is determined during step 1030 that the measured average intensity is greater than the stored maximum average intensity, then the current measured value is stored as the maximum average intensity during step 1035.

If, however, it is determined during step 1030 that the measured average intensity is not greater than the stored maximum average intensity, in other words $E < E_{max}$, then program control will proceed to step 1040. A test is performed during step 1040 to determine if the entire mouth area of the current face has been tested. If it is determined during step 1040 that the entire mouth area of the current face has not been tested, the trial lip ellipse will be repositioned in a previously untested position in the mouth area during step 1045 and program control will thereafter return to step 1025 and continue in the manner described above.

If, however, it is determined during step 1040 that the entire mouth area of the current face has been tested, program control will proceed to step 1050 (FIG. 10*b*). A test is performed during step 1050 to determine if the maximum average intensity value, $E_{max}$, exceeds a predefined threshold. If it is determined during step 1050 that the maximum average intensity value, $E_{max}$, does not exceed the predefined threshold, the lips of the person associated with the face being tested are not moving, and thus, the person is most likely not talking. Thus, program control will proceed to step 1065 without updating the person talking entries in column 350 of the speaker data base 300, which were initialized during step 612 to indicate that the person is not speaking.

If, however, it is determined during step 1050 that the maximum average intensity value, $E_{max}$, does exceed the predefined threshold, the lips of the person associated with the face being tested are moving, and thus, the person is likely talking. Thus, the flag is preferably set during step 1060 in the entry in column 350 of the speaker data base 300 to indicate that the person is most likely talking. The flag in column 350 indicating whether or not the associated person is most likely talking will allow the speaker to be distinguished from non-speakers.

Thereafter, during step 1065, the measured values corresponding to the major axis a, the minor axis b and the angle, α, as well as the center pixel value, of the modelled lip ellipse are stored in the current measured values cells in the entries in columns 335, 337, 340, 342, respectively, of the speaker data base 300, illustrated in FIG. 3, corresponding to the associated person.

A test is performed during step 1070 to determine if there are additional faces in the current video scene to be tested. If it is determined during step 1070 that there are additional faces in the current video scene to be tested, program control will return to step 1010 (FIG. 10*a*), and continue in the manner described above.

If, however, it is determined during step 1070 that there are no additional faces in the current video scene to be tested, program control will proceed to step 1075. A test is performed during step 1075 to determine if the lips of at least one person in the scene are moving. If it is determined during step 1075 that the lips of at least one person in the scene are moving, at least one person is most likely talking, and the PERSON TALKING flag is set during step 1080.

As previously indicated, the PERSON TALKING flag will be transmitted to the other party during step 640 (FIG. 6) to indicate whether the first party is most likely currently talking. If the other party to the videotelephone communication knows that the first party is most likely talking, and thus, most likely not listening, there is no need for the other party to encode their audio signal in great detail.

If, however, it is determined during step 1075 that the lips of at least one person in the scene are not moving, the PERSON TALKING flag is not updated for this video frame, and program control will proceed to step 1085, where the lip motion detection subroutine is exited. Program control will return to the dynamic bit allocation and encoding subroutine at step 735 (FIG. 7).

A test is performed during step 735 to determine if the PERSON TALKING flag was set by the lip motion detection subroutine executed during the previous step. If it is determined during step 735 that the PERSON TALKING flag was not set, the audio activity that was detected during step 615 (FIG. 6) most likely consists of music or other background music, as opposed to speech.

Thus, program control will proceed to step 740 where the dynamic bit allocator 80 will assign an appropriate number of bits for encoding the audio and video signals in order to achieve maximum quality of both the transmitted audio and video signals, since the other party is likely paying attention to both the audio and video information, because they are most likely watching their display, as detected during step 700, and they are most likely not talking, as detected during step 720. In addition, since there are no lips moving in the current video scene, there is little, if any, motion information of interest in the current frame. Thus, more of the video bits are preferably assigned during step 740 to encode the spatial details and slow moving components than are assigned to encode the motion information.

For example, if the videoteleconferencing system is operating at a bit rate of 16 Kbps, a typical bit allocation during step 740 would assign 6 Kbps for encoding the audio signal and 10 Kbps for encoding the video signal. Of the 10 Kbps allocated for encoding the video signal, preferably 9 Kbps are assigned to subbands SB1 through SB4 for encoding the spatial details and 1 Kbps are assigned to subband SB8 for encoding the modelled face regions in the motion subband. Of the 9 Kbps assigned to subbands SB1 through SB4, 7 Kbps are preferably further allocated for encoding the modelled face ellipse region and 2 Kbps are preferably allocated for encoding the background scenery outside the modelled face ellipse.

Thereafter, the audio signal will be encoded during step 710 with the audio bits allocated during step 740 using a non-speech specific audio encoding technique, and continue in the manner described above.

If, however, it is determined during step 735 that the PERSON TALKING flag was set by the lip motion detection subroutine executed during step 730, at least one person is most likely speaking and program control will proceed to step 805 (FIG. 8). The information that is of most interest to the viewer will be the speech and the movement of the mouth area.

Thus, during step 805, the dynamic bit allocator 80 will assign the available bits to accurately encoding the audio signal and the mouth area of the motion information found in subband SB8, since the lip motion is motion information of interest in the current frame. In addition, fewer bits are preferably assigned for encoding the spatial details, particularly of the background scenery.

For example, if the videoteleconferencing system is operating at a bit rate of 16 Kbps, a typical bit allocation during step 805 would assign 8 Kbps for encoding the audio signal and 8 Kbps for encoding the video signal. Of the 8 Kbps allocated for encoding the video signal, preferably 6 Kbps are assigned to subbands SB1 through SB4 for encoding the spatial details and 2 Kbps are assigned to subband SB8 for encoding the modelled lip region of the speaker in the motion subband. Of the 6 Kbps assigned to subbands SB1 through SB4, 5 Kbps are preferably further allocated for encoding the modelled face ellipse region and 1 Kbps are preferably allocated for encoding the background scenery outside the modelled face ellipse.

The audio signal will be encoded during step 810 with the audio bits allocated during step 805 using a speech specific audio encoding technique, in order to enhance the audio encoding of the voice signal.

As is well-known, when a person is speaking, the mouth area movement, particularly the movement of the lips, is highly correlated with the speech sound produced. For example, when a person makes a "short a" sound, their mouth will be open. Thus, based on the particular sound produced, the position of the mouth may be predicted.

Accordingly, in a preferred embodiment, the dynamic bit allocation and encoding process will analyze the speech sound produced during step 825 in order to predict the position of the mouth. This prediction may be separately transmitted to the receiver 400, which would allow the receiver 400 to verify and enhance the video reconstruction of the mouth image, such as if the transmitted video information is corrupted by noise.

In an alternate embodiment, the transmitter 10 and receiver 400 can maintain a data base of indexed parameters of mouth ellipses in various positions. In this manner, the transmitter 10 can analyze the produced sound and just transmit the index number of the proper mouth position that corresponds to the produced sound.

A test is performed during step 840 to determine if there are multiple faces in the scene, for example, by analyzing the information in column 345 of the speaker data base 300. If it is determined during step 840 that there are multiple faces in the scene, the dynamic bit allocator 80 will assign more of the video bits during step 850 for encoding the modelled ellipses of the speaker than for encoding the ellipses associated with any nonspeakers. The speaker may be distinguished from the non-speakers by analyzing the information in column 350 of the speaker data base 300.

Thereafter, program control will proceed to step 630 (FIG. 6) in order to encode the video signal by quantizing each of the retained spatial-temporal frequency subbands using the determined video bit allocations, and continues in the manner described above.

Figure 11:
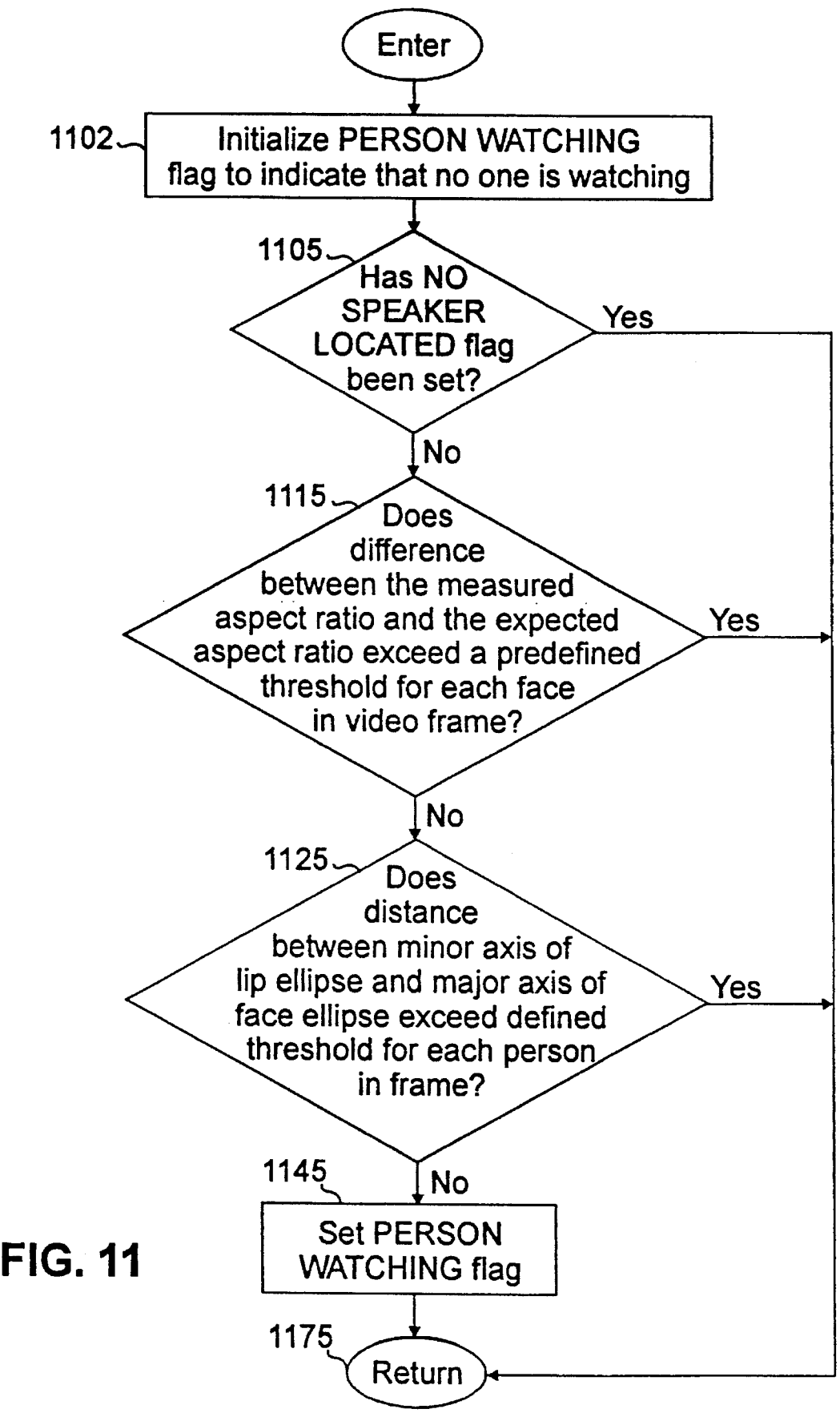
FIG. 11 is a flow chart describing an exemplary person watching subroutine according to the present invention, as utilized by the dynamic bit allocation and encoding process of FIG. 6 for determining whether a person is watching a video display.

As previously indicated, a person watching subroutine, illustrated in FIG. 11, is performed by the dynamic bit allocation and encoding process during step 635. The person watching subroutine will analyze the video images to determine if any of the people in front of the camera are most likely watching the display screen. If the person watching subroutine performed by the transmitter 10 of a first party determines that the first party is most likely not watching the display screen, there is no need for the transmitter of the second party to transmit the video signal in much detail.

As illustrated in FIG. 11, the PERSON WATCHING flag is preferably initialized during step 1102 to indicate that this party is most likely not currently watching the display. Thereafter, a test is performed during step 1105 to determine if the NO SPEAKER LOCATED flag was set during step 945 of the speaker location identification subroutine. If it is determined during step 1105 that the NO SPEAKER LOCATED flag was set during step 945, there is no one in front of the camera, and most likely, no one is watching the display screen. The person watching subroutine will thereafter be exited during step 1175 without setting the PERSON WATCHING flag. If, however, it is determined during step 1105 that the NO SPEAKER LOCATED flag was not set during step 945, there is at least one person in front of the camera who may be watching the display screen.

Thus, a test is performed during step 1115 to determine if the difference between the measured aspect ratio of each face ellipse detected in the current frame and the expected aspect ratio for each face ellipse recorded in the speaker data base 300 during initialization, exceed a predefined threshold. It is noted that the aspect ratio of an ellipse is obtained by dividing the major axis by the minor axis. If it is determined during step 1115 that the difference between the measured aspect ratios and the expected aspect ratios exceed the predefined threshold, the one or more persons in front of the camera are most likely facing sideways, and are thus, not likely watching the display screen. Thus, the person watching subroutine will thereafter be exited during step 1175 without setting the PERSON WATCHING flag.

If, however, it is determined during step 1115 that the difference between the measured aspect ratios and the expected aspect ratios do not exceed the predefined threshold, program control will proceed to step 1125. A test is performed during step 1125 to determine if the distance between the minor axis of the modelled lip ellipse and the major axis of the modelled face ellipse exceeds a predefined threshold for each person in the frame. If it is determined during step 1125 that the spatial distance for each person in the frame does exceed the defined threshold, then the persons in front of the camera are most likely facing sideways, and are thus, not likely watching the display screen. Thus, the person watching subroutine will thereafter be exited during step 1175 without setting the PERSON WATCHING flag.

If, however, it is determined during step 1125 that the distance for each person in the frame does not exceed the defined threshold, then the persons in front of the camera are most likely watching the display screen. Thus, the PERSON WATCHING flag will be set during step 1145 to indicate that someone is most likely watching the display screen. Thereafter, the person watching subroutine will be exited at step 1175, and program control will return to the dynamic bit allocation and encoding subroutine at step 640, and proceed in the manner described above.

It is to be understood that the embodiments and variations shown and described herein are illustrative of the principles of this invention only and that various modifications may be implemented by those skilled in the art without departing from the scope and spirit of the invention.

I claim:

1. A method of selecting an audio encoding technique for encoding an audio signal by an audio-visual communication system that contains audio and video information, said video information including a view of a facial region of at least one person, said facial region including lips, said method comprising the steps of:

analyzing said audio signal to determine if there is audio activity;

analyzing said video signal to determine if said lips of said person in said view are moving; and encoding said audio signal with a speech specific audio encoding technique if said analyzing steps determine that said lips are moving while there is audio activity and encoding said audio signal with a non-speech specific audio encoding technique if said analyzing steps determine that said lips are not moving while there is audio activity.

2. An apparatus for selecting an audio encoding technique for encoding an audio signal by an audio-visual communication system that contains audio and video information, said video information including a view of a facial region of at least one person, said facial region including lips, said apparatus comprising the steps of:

means for analyzing said audio signal to determine if there is audio activity;

means for analyzing said video signal to determine if said lips of said person in said view are moving;

a speech specific audio encoder for encoding said audio signal if said means for analyzing said audio and video signals determine that said lips are moving while there is audio activity; and a non-speech specific audio encoder for encoding said audio signal if said means for analyzing said audio and video signals determine that said lips are not moving while there is audio activity.

3. A method of selecting an audio encoding technique for encoding an audio signal by an audio-visual communication system that contains audio and video information, said video information including a view of a facial region of at least one person, said facial region including lips, said method comprising the steps of:

analyzing said audio signal to determine if there is audio activity;

analyzing said video signal to determine if said lips of said person in said view are moving:

encoding said audio signal with a speech specific audio encoding technique if said analyzing steps determine that said lips are moving while there is audio activity and encoding said audio signal with a non-speech specific audio encoding technique if said analyzing steps determine that said lips are not moving while there is audio activity; and encoding said audio signal with a comfort noise encoding technique if said step of analyzing said audio signal determines that there is no audio activity.

4. The method of claim 3 wherein a bit rate of about 1 kilobits per second is used for the comfort noise encoding technique.

5. An apparatus for selecting an audio encoding technique for encoding an audio signal by an audio-visual communication system that contains audio and video information, said video information including a view of a facial region of at least one person, said facial region including lips, said apparatus comprising the steps of:

means for analyzing said audio signal to determine if there is audio activity;

means for analyzing said video signal to determine if said lips of said person in said view are moving;

a speech specific audio encoder for encoding said audio signal if said means for analyzing said audio and video signals determine that said lips are moving while there is audio activity;

a non-speech specific audio encoder for encoding said audio signal if said means for analyzing said audio and video signals determine that said lips are not moving while there is audio activity; and a comfort noise audio encoder for encoding said audio signal if said means for analyzing said audio signal determines that there is no audio activity.

6. The method of claim 1, wherein the step of analyzing said audio signals further comprises determining if the amount of audio energy exceeds a predetermined threshold.

7. The method of claim 1, wherein a predetermined limited number of bits are available for encoding both the audio and video information, and further comprising the step of dynamically allocating relatively few of the predetermined limited number of bits for encoding the audio signal when said analyzing steps determine that audio activity is not correlated with lip movement.

8. The method of claim 1, wherein a predetermined limited number of bits are available for encoding both the audio and video information, and further comprising the step of dynamically allocating a higher number of the predetermined limited number of bits for encoding the audio signal when said analyzing steps determine that audio activity is correlated with lip movement.

9. The method of claim 1 further comprising the step of dynamically allocating an appropriate number of bits for audio and video information encoding.

* * * * *